(12) United States Patent
Blankenhorn

(10) Patent No.: US 9,891,127 B2
(45) Date of Patent: Feb. 13, 2018

(54) CAPACITIVE PRESSURE MEASURING CELL AND PRESSURE MEASURING DEVICE

(71) Applicant: IFM Electronic GmbH, Essen (DE)

(72) Inventor: Oliver Blankenhorn, Bodnegg (DE)

(73) Assignee: IFM Electronic GmbH, Essen (DE)

( * ) Notice: Subject to any disclaimer, the term of this patent is extended or adjusted under 35 U.S.C. 154(b) by 0 days.

(21) Appl. No.: 15/293,495

(22) Filed: Oct. 14, 2016

(65) Prior Publication Data

US 2017/0108393 A1   Apr. 20, 2017

(51) Int. Cl.
*G01L 9/00* (2006.01)
*G01L 19/00* (2006.01)
*G01L 19/14* (2006.01)

(52) U.S. Cl.
CPC ........ *G01L 9/0075* (2013.01); *G01L 19/0061* (2013.01); *G01L 19/14* (2013.01)

(58) Field of Classification Search
CPC .................................. G01L 9/12; G01L 9/04
USPC .................................................... 73/718, 726
See application file for complete search history.

(56) References Cited

U.S. PATENT DOCUMENTS

| | | | | |
|---|---|---|---|---|
| 4,769,738 A * | 9/1988 | Nakamura | ............ | G01L 9/0073 361/283.1 |
| 6,341,527 B1 * | 1/2002 | Ishikura | ................ | G01L 9/0075 73/718 |
| 6,948,374 B2 * | 9/2005 | Miyashita | ............ | G01L 9/0042 73/718 |
| 8,230,746 B2 * | 7/2012 | Miyashita | ............ | G01L 9/0073 73/718 |

FOREIGN PATENT DOCUMENTS

| | | |
|---|---|---|
| DE | 10243961 A1 | 1/2004 |
| DE | 102012208757 A1 | 7/2013 |
| DE | 102012213572 A1 | 2/2014 |
| DE | 102013213857 A1 | 10/2014 |
| DE | 102013220091 A1 | 4/2015 |
| DE | 102016200164 B3 | 3/2016 |

* cited by examiner

*Primary Examiner* — Jewel V Thompson
(74) *Attorney, Agent, or Firm* — Bond Schoeneck & King, PLLC; George R. McGuire

(57) ABSTRACT

The invention relates to a capacitive pressure measuring cell for detecting the pressure of a medium adjacent to the pressure measuring cell, comprising a ceramic elastic measuring membrane, the first side of which at least partially contacts the medium and the second side of which facing away from the medium comprises a measuring electrode, and a ceramic cylindrical basic body disposed opposite to the second side of the measuring membrane and comprising at least one counter electrode which forms a measuring capacitance with the measuring electrode.

12 Claims, 1 Drawing Sheet

CAPACITIVE PRESSURE MEASURING CELL AND PRESSURE MEASURING DEVICE

CROSS-REFERENCE TO RELATED APPLICATION

The present application relates to and claims priority to German Patent Application 102015220178.3, filed Oct. 16, 2015, the entirety of which is hereby incorporated by reference.

BACKGROUND OF THE INVENTION

Field of the Invention

The invention relates to a capacitive pressure measuring cell for detecting the pressure of a medium adjacent to the pressure measuring cell and a pressure measuring device including such a pressure measuring cell.

Capacitive pressure measuring devices or pressure sensors are used in many industrial fields for pressure measurements. They often comprise a ceramic pressure measuring cell as a transducer for the process pressure and an evaluation unit for signal processing.

Typical measuring cells consist of a compact unit comprising a ceramic base body and a membrane, wherein a glass solder ring is disposed between the base body and the membrane. The cavity thus obtained between the base body and the membrane allows the longitudinal movement of the membrane due to a pressure impact. At the bottom side of the membrane and at the opposite upper side of the base body respective electrodes are provided which together form a measuring capacitor. By the action of pressure a deformation of the membrane is caused resulting in a change in capacitance of the measuring capacitor.

For contacting the electrodes through holes are provided in the base body of the pressure measuring cell on the opposite side of the membrane in a number corresponding to the number of the electrodes. These through holes lead up to the electrodes and comprise an electrically conductive coating at their inner wall over their entire length. A contact pin is inserted into the exit opening of each through hole on the upper side of the base body and an electrical contact with the coating is made using a solder joint such that the electrode can be electrically contacted via the pin.

Such a pressure measurement cell is inter alia known from the documents DE 102012213572 A1, DE 102012208757 A1 and DE 102013213857 A1 of the present applicant, wherein in the former in order to make an electrical contact the printed circuit board rests directly on the coating and thus no pin is required. The production of vias in a substrate is known, for example, from DE 10243961 A1.

A key consideration in such pressure measuring cells is inter alia the mechanical pressure limit, that is how long the measuring cell can withstand a predetermined excess pressure before it is damaged and thus the risk arises that the pressurized medium passes into the interior of the measuring device. Although the strength can be increased when a thicker base body is provided, this measure, however, results in manufacturing problems. For example, with increasing thickness of the base body the formation of the through hole and the conductive inner coating within the through-hole becomes more difficult. Moreover, thereby also the overall construction of the measuring device is extended, which is contrary in particular to the requirements of a configuration as compact as possible.

It is an object of the invention to improve the mechanical pressure limit of the pressure measuring cell without changing the fundamental configuration of known pressure measuring cells of the type in question, in particular as regards the material thickness.

SUMMARY OF THE INVENTION

This object is achieved by a pressure measuring cell comprising the features of claim 1 and by an electronic pressure measuring device according to claim 7. Advantageous embodiments of the invention are specified in the subclaims.

According to the invention the end portions of the through holes at the upper side of the base body each have a funnel shaped extension, wherein the exit edge of each funnel-shaped extension is formed in the shape of an ellipse such that the notch effect is smaller than in a circular form. Herein, the funnel shaped extension is configured such that each exit opening of the through holes at the upper side of the base body at least partially forms a bevel—also referred to as counterbore. By means of the elliptical profile of the exit edges the bevels extend with varying angles. Preferably, the major axes of the ellipses are aligned tangentially. It should be noted that the term "elliptical shape" also means any oval shapes.

The thus achieved technical effect is the reduction of the mechanical stresses obtained by the pressure impact in the base body. This effect is achieved by increasing the radius at the exit opening of the through hole at the upper side of the base body of the pressure measuring cell, while the diameter of the through hole itself remains unchanged. In simple terms this can be expressed so that the radially extending stress flows at the surface of the base body are bypassed by the elliptical shape quasi "laminar" around the obstacle, that is the through hole. Specifically, this means that by means of the elliptical shape the respective occurring notch effect is smaller compared to a circular shape such that in particular occurring tensile stresses are reduced. As a result, by reducing mechanical stresses an increase in strength is achieved which ultimately leads to the fact that the pressure measuring cell can withstand predetermined excessive pressures for a longer time or even higher excessive pressures for the same configuration and unchanged dimensions.

Preferably, the major axes of the ellipses are therefore oriented tangentially. The bevels advantageously have a uniform, i.e. stepless behaviour from the circumference of the through hole up to their exit edge. This inter alia brings about advantages in manufacturing.

Although the invention relates to a capacitive pressure measuring cell it is likewise applicable to resistive measuring cells in which the pressure measurement takes place by means of strain gauges and which comprise a ceramic base body.

The pressure measuring device according to the invention substantially consists of a process connection, a housing and a pressure measuring cell according to the invention. The process connection mostly includes the pressure measuring cell and provides the mechanical connection to a container which accommodates the medium to be measured. The housing is mounted onto the process connection. In the housing in particular the electronic unit necessary for processing and conditioning the measured values into a measurement signal is disposed. In addition, a connector for power and/or signal transmission as well as a display and control unit may be provided at the housing.

BRIEF DESCRIPTION OF THE DRAWINGS

The invention will now be explained with reference to an exemplary embodiment shown in the drawings. In the drawings.

DETAILED DESCRIPTION

Figure 1:
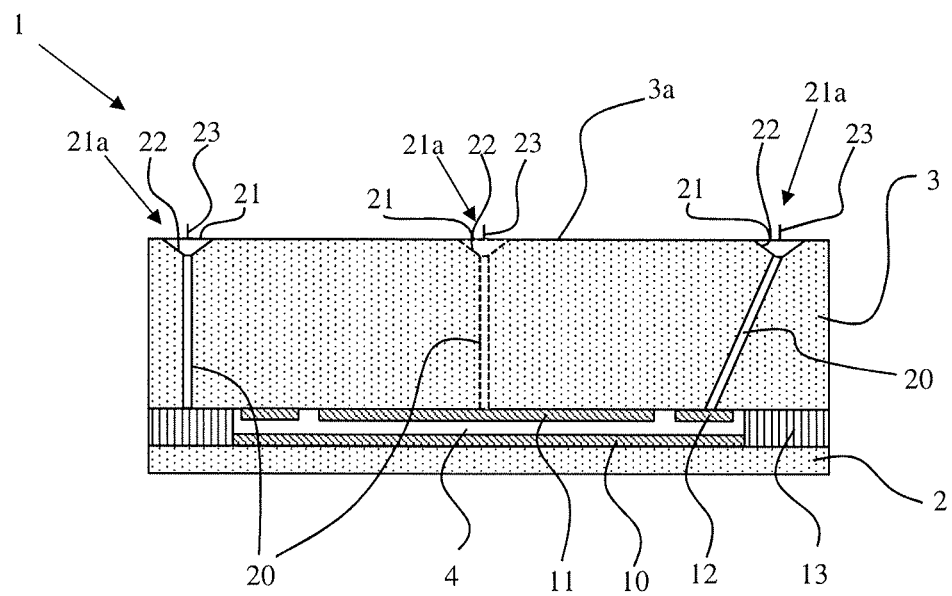
FIG. 1 is a schematic cross-sectional view of a pressure measuring cell according to the invention.

In the following description of the preferred embodiments like reference numerals designate identical or comparable components.

FIG. 1 shows a capacitive pressure measuring cell 1 comprising a ceramic base body 3 and a measuring membrane 2 likewise made of ceramic. The measuring membrane 2 and the base body 3 are held spaced apart from each other at the edge by means of a spacer 13 made e.g. of glass, glass solder or a glass alloy and are connected to each other, such that a measuring chamber 4 is formed between the membrane 2 and the base body 4.

The measuring membrane 2 contacts at its outer side a medium the pressure of which is to be measured by means of the measuring cell 1. The measuring chamber 4 between the base body 3 and the membrane 2 enables the longitudinal movement of the membrane 2 due to a pressure impact. At the inner sides of the membrane 2 and the opposite base body 3 respective electrodes 10, 11, 12 are provided, which together form at least one measuring capacitor. The pressure impact causes a deformation of the membrane 2 resulting in a change in capacitance of the measuring capacitor.

For contacting the electrodes 10, 11, 12 a respective through hole 20 is provided in the base body 3. The through holes 20 are provided with a conductive coating. On the upper side 3a of the body 3 a respective contact pin 23 is inserted into the exit openings 21 of the through holes 20 which is preferably connected electrically conductive to the coating by means of a solder. For connecting the electrode 10 disposed on the membrane 2 in addition an electrical connection over or through the spacer 13 is required. In this way the electrodes 10, 11, 12 can be electrically contacted from the upper side 3a of the body 3, i.e. the change in capacitance occurring between the electrodes due to a pressure impact can be tapped.

The through hole 20 in the center is shown in phantom because actually it is not visible in a section through the center of the pressure measuring cell. Here it is again stressed that the view shown in FIG. 1 is a schematic diagram or principle sketch in which the focus is directed at the illustration of the invention. In particular, the contacting of the electrode 12 by means of the inclined extending through hole 20 can be realized differently. In approximate agreement with FIG. 2 this representation has been selected here.

In FIG. 1 the end portions 21a of the through holes 20 with the funnel-shaped extensions can be seen. According to the invention the exit edges of the funnel-shaped extensions are not configured circular, but elliptical, as is obvious in FIG. 2.

Figure 2:
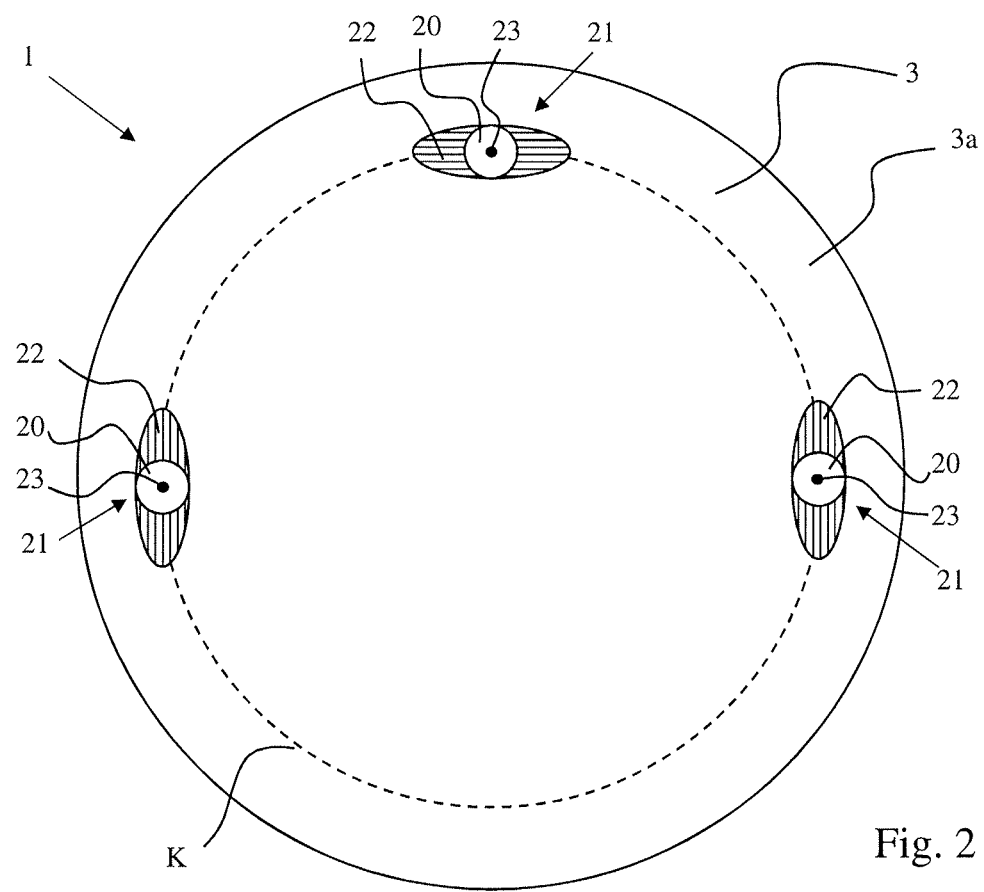
FIG. 2 is a top view of a pressure measuring cell according to the invention.

FIG. 2 shows a top view of a pressure measuring cell according to the invention. The exit openings 21 of the through holes 20 at the upper side 3a of the base body 3 are arranged along an imaginary circular line K. The circular line K has only been shown here in dashed lines in order to illustrate the aspect of the arrangement. Also indicated is a respective contact pin 23 which is disposed at the center in the through holes 20.

During a pressure impact onto the measuring cell 1 the membrane 2 and the base body 3 respectively experience a compression on the side facing the medium and an elongation on the opposite side. In this case the elongation side and in particular the upper side 3a of the base body is critical to the mechanical pressure limit of the measuring cell 1, because with a cracked membrane 2 in fact no measurements are possible, but the medium yet cannot penetrate into the interior of the pressure measuring device. In order to improve the mechanical pressure limit of the measuring cell 1 the tensile stresses caused by the elongation must be reduced. This is achieved by an enlargement of the end portions 21 of the through holes 20 disposed at the upper side 3a of the base body. However, the size of the through hole 20 itself should be made as small as possible in order to simplify the contacting of the pins 23 with the electrically conductive inner coating of the through hole 20. The solution thus provides a bevel 22 as flat as possible which does not change the diameter of the through hole 20 itself, but increases or extends its exit opening 21 on the upper side 3a in such a manner that thereby a significant reduction in the tensile stresses is achieved which ultimately leads to an improvement of the mechanical pressure limit of the entire measuring cell 1.

However, the spatial extent of this enlargement of the exit opening 21 is limited. On the one hand measuring cells of the type in question typically have a diameter of about 2 cm and on the other hand the through holes 20 must be located in the edge region of the measuring cell 1 in order not to affect the pressure-induced movement of the measuring cell 1 in the interior area. Consequently, it is useful to configure the exit openings 21 of the through holes 20 or their exit edges in an elliptical shape in order to achieve an enlargement by an extension in the tangential direction, while in the radial direction the enlargement can be made minimal. Here, the enlargement in the radial direction indeed may be dispensed with such that the smallest radius of the ellipse corresponds to the radius of the through hole 20 or the extension of the minor axis corresponds to the diameter of the through hole 20. Studies on this have shown that with a ratio between the largest diameter and the smallest diameter or between the extension of the main axis and the extension of the minor axis of the ellipse of 2:1 an optimum between the spatial extension and a reduction of the tensile stresses is achieved.

The elliptical shape of the exit edges in this case represents a preferred embodiment of the invention, however, in principle any oval shapes are conceivable. It is essential that by means of an enlargement of the through holes 20 their radius or circumference is increased.

Although the exemplary embodiment shows a capacitive pressure measuring cell the invention can likewise be applied in resistive measuring cells with strain gauges when the base body is made of ceramic. The base body is often made of steel, but in some cases there are also applications where it is preferred to implement the base of ceramic. In this case there may be a need to implement the connections to the strain gauges through the ceramic body by means of through holes. Since here, too, the ceramic body experiences a pressure-induced longitudinal movement, the thereby occurring mechanical stresses can be minimized by providing the through holes respectively with a bevel and an oval or elliptical exit edge according to the invention, whereby as a result an improvement of the mechanical pressure limit is achieved.

The invention claimed is:

1. Capacitive pressure measuring cell (1) for detecting the pressure of a medium adjacent to the pressure measuring cell (1), comprising a ceramic elastic measuring membrane (2) the first side of which at least partially is in contact with the medium and the second side of which facing away from the medium comprises a measuring electrode (10); and a ceramic cylindrical basic body (3) disposed opposite to the second side of the measuring membrane (2) and comprising at least one counter-electrode (11, 12) which forms a measuring capacitance with the measuring electrode (10), wherein the electrical contact of the measuring and the counter electrode (10, 11, 12) is achieved by through holes (20) provided in the base body (3), wherein the inner walls of the through holes respectively comprise a conductive coating, characterized in that the end portions (21a) of the through holes (20) at the upper side (3a) of the base body (3) each have a funnel-shaped enlargement, wherein the exit edge of each funnel-shaped enlargement is formed in the shape of an ellipse, such that the notch effect is smaller than with a circular shape.

2. Capacitive pressure measuring cell according to claim 1, characterized in that the main axes of the ellipses are aligned tangentially.

3. Capacitive pressure measuring cell according to claim 1, characterized in that in the ellipses the ratio between major and minor axis is 2:1.

4. Capacitive pressure measuring cell according to claim 1,
characterized in that
the extension of the minor axis corresponds to the diameter of the through hole (20).

5. Capacitive pressure measuring cell according to claim 1,
characterized in that
the end portions (21a) of the through holes (20) are disposed at the upper side (3a) of the base body (3) along a circular line (K).

6. Capacitive pressure measuring cell according to claim 1,
characterized in that
the bevels (22) extend uniform from the periphery of the through hole (20) to the exit edge of each funnel-shaped enlargement.

7. Electronic pressure measuring device comprising a process connection, a housing mounted thereon and a pressure measuring cell (1) for detecting the pressure prevailing in a medium, wherein the pressure measuring cell (1) comprises:
a ceramic elastic measuring membrane (2) the first side of which at least partially is in contact with the medium and the second side of which facing away from the medium comprises a measuring electrode (10); and
a ceramic cylindrical basic body (3) disposed opposite to the second side of the measuring membrane (2) and comprising at least one counter-electrode (11, 12) which forms a measuring capacitance with the measuring electrode (10),
wherein the electrical contact of the measuring and the counter electrode (10, 11, 12) is achieved by through holes (20) provided in the base body (3), wherein the inner walls of the through holes respectively comprise a conductive coating,
characterized in that
the end portions (21a) of the through holes (20) at the upper side (3a) of the base body (3) each have a funnel-shaped enlargement, wherein the exit edge of each funnel-shaped enlargement is formed in the shape of an ellipse, such that the notch effect is smaller than with a circular shape.

8. Electronic pressure measuring device according to claim 7, wherein the pressure measuring cell (1) is characterized in that the main axes of the ellipses are aligned tangentially.

9. Electronic pressure measuring device according to claim 7, wherein the pressure measuring cell (1) is characterized in that in the ellipses the ratio between major and minor axis is 2:1.

10. Electronic pressure measuring device according to claim 7, wherein the pressure measuring cell (1) is characterized in that the extension of the minor axis corresponds to the diameter of the through hole (20).

11. Electronic pressure measuring device according to claim 7, wherein the pressure measuring cell (1) is characterized in that the end portions (21a) of the through holes (20) are disposed at the upper side (3a) of the base body (3) along a circular line (K).

12. Electronic pressure measuring device according to claim 7, wherein the pressure measuring cell (1) is characterized in that the bevels (22) extend uniform, from the periphery of the through hole (20) to the exit edge of each funnel-shaped enlargement.

* * * * *